Nov. 24, 1964     F. L. CLEMENT     3,158,402
ARTICULATED CHASSIS DUMP TRAILER
Filed Oct. 5, 1962     3 Sheets-Sheet 1
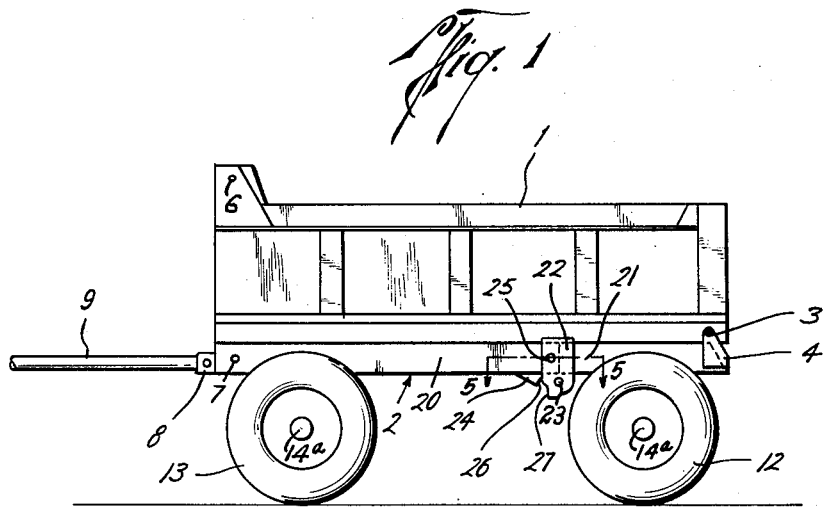
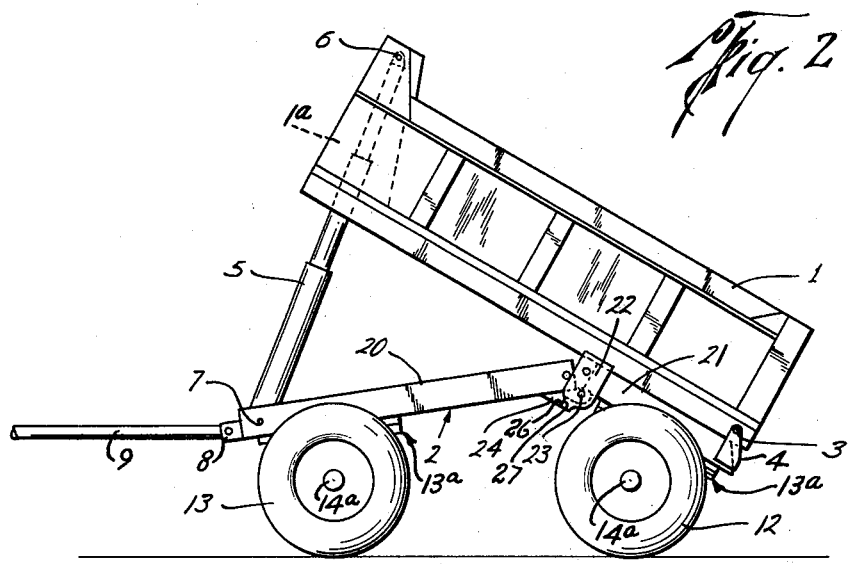
F. L. Clement
INVENTOR.
BY G. C. Helmig
ATTORNEY Nov. 24, 1964          F. L. CLEMENT          3,158,402
              ARTICULATED CHASSIS DUMP TRAILER
Filed Oct. 5, 1962                     3 Sheets-Sheet 2

F. L. Clement
INVENTOR.

BY G C Helming

ATTORNEY

Nov. 24, 1964 F. L. CLEMENT 3,158,402
ARTICULATED CHASSIS DUMP TRAILER
Filed Oct. 5, 1962 3 Sheets-Sheet 3

INVENTOR
F. L. CLEMENT,
BY G C Helmly
ATTORNEY

United States Patent Office 3,158,402
Patented Nov. 24, 1964

3,158,402
ARTICULATED CHASSIS DUMP TRAILER
Frank L. Clement, % Clement-Braswell, Inc.,
P.O. Box 696, Minden, La.
Filed Oct. 5, 1962, Ser. No. 228,610
3 Claims. (Cl. 298—20)

This invention relates to dump vehicles of the type in which the body normally rests on a main frame in substantially horizontal hauling position and can be elevated above one end of the frame and swung about an opposite end fulcrum mounting to a downwardly inclined end dump position for gravity unloading.

Because of the needs for vehicle road clearance and for heavy duty running gear, the height at the unloading edge of a conventional dump body usually is located considerably above the ground and the drop distance from the body is often so great as to cause windswept loss of fine particle material in a dust cloud or an undesirable scattering of large pieces. Depending on kind and particle size of material being handled and the point of deposit, including, for example, the inside of a gravel spreader or a hopper for a cement mixer or coal loader, there will be advantages in providing a vehicle which differs only slightly from the conventional and is free of costly structural complexities and easily enables a selectively variable height at the dump end of a tiltable body to minimize free fall distance of the major portion of a loose particle load.

Accordingly, an object of this invention is to provide an improved dump vehicle having normal road clearance for transit and hauling purposes and a frame body arrangement to respond automatically to body tilting forces for a lowering of the dumping end.

Another object of the invention is to provide load transmitting interconnections beteween front and rear portions of a tiltable body and an underlying main frame and which main frame is articulated or comprised of a pair of end to end successive sections pivotally joined at adjacent ends on a transverse horizontal axis for upward buckling action and about the transverse axes of ground support gear longitudinally located between the intermediately disposed frame section pivot axis and the front and rear load transmitting interconnections between the frame and the body.

A further object of the invention is to provide a tiltable dump body superposed on an articulated frame whose transverse axis of articulation is closer to the dump end, with the shorter frame section underlying the dumping end portion of the body and with lift mechanism for the other end of the body connected to the longer frame section and beyond its ground supporting assembly so that body lifting load imposed on the interpivoted frame sections can rock the sections to raise their interpivoted ends and tilt the shorter frame section downwardly with the body, thereby lowering the dumping end of the body.

A still further object of the invention is to provide stop abutments on the respective frame sections for movement into engagement as a limit to a given angle of inclination of the downward tilt of the frame section at the dumping end and thereby the extent of lowering of the body dump end, whereupon the tilted body can be further upended about its fulcrum mounting at its dumping end on the adjacent end portion of the underlying frame section.

Another and important object is to provide a dump vehicle having an articulated main frame mounted on flexible suspension running gear whose elastic elements carry and cushion the entire load in unelevated body hauling position and which spring elements upon upward buckling of the interpivoted frame are substantially relived from gravity loading by the transference of load directly on the running gear axle mechanism and through inflexible distance rods which have axle and frame connections at oppostite ends so as to tilt with the frame during body elevation and raise the frame connected ends of the distance rods, whereby the rods become positioned for action under compression longitudinally thereof in the transmission of body load.

Other objects and advantages will become apparent from the following specification having reference to the accompanying drawings in which:

FIG. 1 is a side elevation of the improved vehicle illustrating the parts in hauling position;

FIG. 2 is a side elevation illustrating the parts in one dump position;

Figure 3:
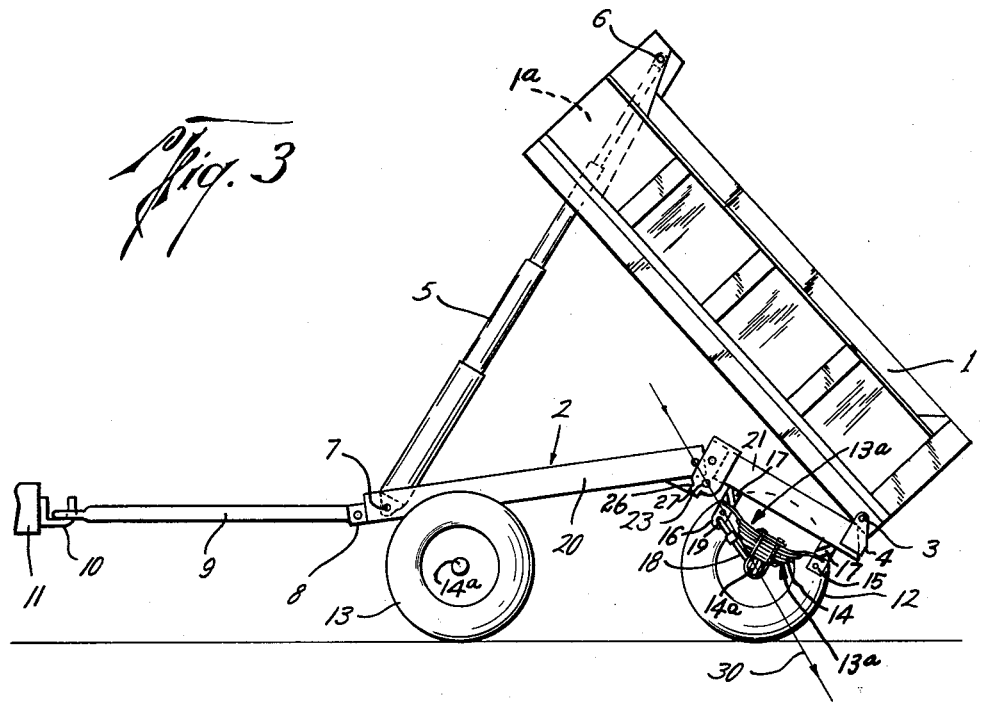
FIG. 3 is a side elevation showing the body elevated to a higher dump position than that shown in FIG. 2.

In the drawing, a trailer type road vehicle is illustrated as having a conventional dump body 1 for elevation at its front end to a rearwardly and downwardly inclined dump position. Its rear end is fitted with any suitable closure door and its underside rests throughout its length in transit position on a chassis including a longitudinally extending main frame 2 and its running gear to be described. For dumping purposes, the rear end of the body is fulcrumed or pivotally mounted on a transverse axle by means of pivot pins 3 connecting the sides of the body with upstanding frame brackets 4 at opposite sides of the frame and immediate the rear end of the frame side members. In its front wall the body 1 has a central pocket 1a to receive the upper end of a lift mechanism 5 whose upper end is pivoted at 6 to the top of the body and whose lower end is pivotally connected at 7 to the front end of the main frame 2. A preferred lift mechanism is an extensible hydraulic ram and cylinder.

Beneath the main frame 2 and forwardly of the frame and body load transmitting interconnection 3 and rearwardly from the pivot connection 7, there is located the aforesaid ground engaging running gear of the chassis which may comprise, as illustrated, a pair of wheel and dead axle assemblies with spring suspension connections between the axle and the frame. A front frame bracket 8 pivotally connects the rear end of a tow bar 9 whose front end, as seen in FIG. 3, may have a connecting eye to receive the usual hitching hook 10 fastened at the rear of a towing vehicle, of which only a portion is shown at 11.

Figure 4:
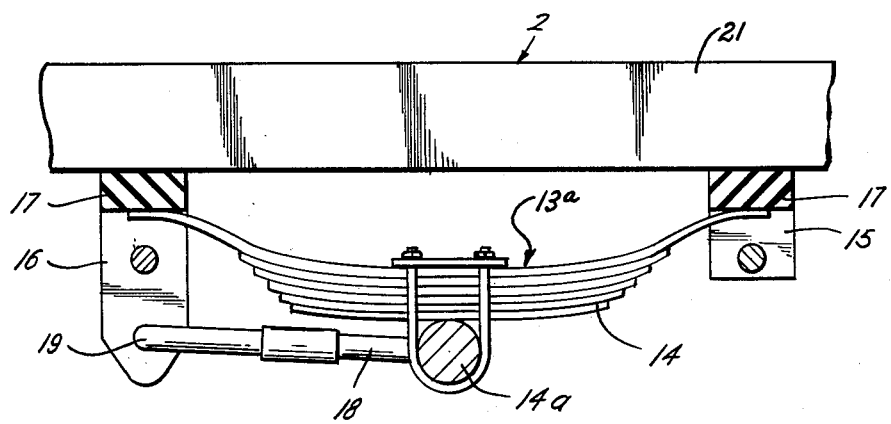
FIG. 4 is a fragmentary longitudinal section of a spring and axle assembly on a large scale.
Figure 5:
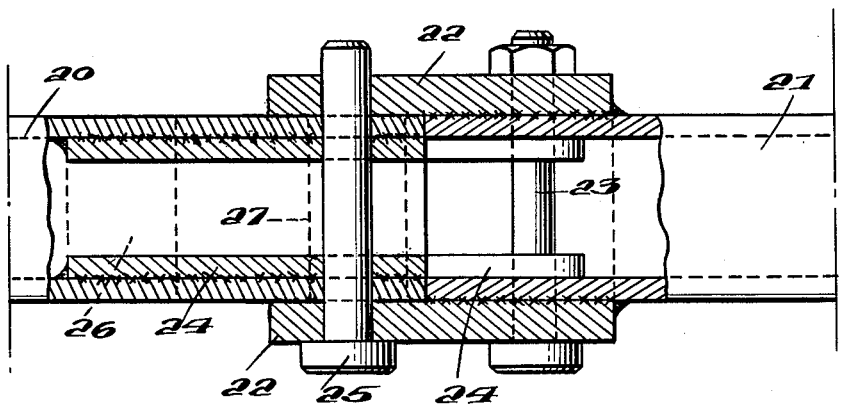
FIG. 5 is a section taken on line 5—5 of FIG. 1.
Figure 6:
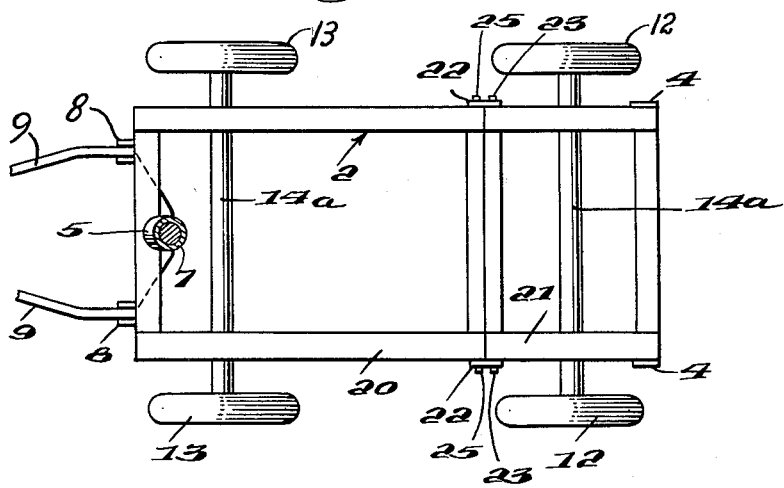
FIG. 6 is a top plan view (omitting the dump body) of a preferred form of chassis employed in a self-supporting dump trailer according to the invention.

When a relatively short length body is to be used with fairly close coupled front and rear axles mounting a pair of rear wheels 12 and a pair of front wheels 13 at opposite ends, there will be sufficient flexibility in the running gear connections to enable the towed vehicle to negotiate road turns without necessarily providing for dirigibility of any of the wheels. With that in mind, the spring suspension 13a illustrated includes a longitudinally extending multiple leaf spring pack 14 adjacent each wheel of each axle and suitably secured above the axle 14a, as in FIG. 4. Opposite ends of the spring pack 14 fit into sockets or spaces within depending rear and front brackets 15 and 16 attached to the main frame 2 and provided with downwardly facing bearing blocks 17 on which the spring ends can slide to accommodate deflection. For providing longitudinal axle position stability, there is associated with each spring a longitudinally projected distance or radius rod 18 secured at one end to the axle and pivotally connected at its opposite end 19 to the spring mounting bracket 16.

In this instance, the main frame 2 is comprised of a pair of frame sections 20 and 21 arranged in end to end succession and pivotally interconnected at adjacent ends so as to be capable of articulating with respect to one another about a transverse axis. Preferably, the frame sections 20 and 21 are arranged to project as horizontal continuations one of the other in the same horizontal plane when in hauling position, as seen in FIG. 1. The rearmost section 21 straddles or overhangs both sides of the rearmost axle and likewise the forward frame section 20 extends longitudinally beyond both sides of the front axle but the foremost section 20 is considerably longer than the rearmost section 21 for a favorable leverage advantage. For joining adjacent ends of the frame sections and accommodating an upward buckling at the joint, the forward end of the rearward section 21 at each side rail has welded thereto a frame bracket 22 which projects a slight distance forwardly and also slightly below the frame section 21. Its downward projection mounts a pivot pin 23 which connects it to a frame bracket 24 rigidly secured to the rear end of the frame section 20. The forward projection of the connecting plate 22 is arranged to overlap an adjacent end portion of the forward frame section 20 and co-operating openings in the overlapping parts come into transverse alignment when the frame sections 20 and 21 are in horizontal alignment so as to receive a removable latching pin 25 which thereby holds the frame sections against upward buckling from straight line continuation one with the other in the hauling position of the parts. The depending frame bracket 24 has a rearwardly facing stop abutment 26 which is for co-operating engagement by a forwardly facing stop abutment 27 on the depending frame bracket 22. These stop members 26 and 27 come into abutment upon upward buckling of the frame sections 20 and 21 and an elevation of their interconnecting pivot pin 23 to a height at which the rear frame section 21 extends at a predetermined angle of inclination and which lowers the body hinge pivot 3 from its normal hauling height to a depressed position, as illustrated in FIGS. 2 and 3.

In the hauling position as seen in FIG. 1, the articulated frame sections 20 and 21 are in horizontal or straight line continuation and are so located by means of the releasable locking pin 25 which holds the frame sections against upward buckling action about the intermediately disposed interconnecting pivot. Throughout the length of the frame, the superposed body 1 bears downwardly on the frame and co-operates with the latching pin 25 in maintaining the frame sections in longitudinal alignment. In the event that the operating conditions are such that the loaded material can be dumped from the rear end of the body at its normal hauling position, then the locking pins 25 are left in place and actuation of the lift mechanism 5 will raise the front end of the body about its rear fulcrum pin mounting 3 and the load will slide from the tilted body at the raised height of the unloading edge similarly to that of the conventional dump vehicle.

On the other hand, if the operating conditions dictate the desirability of a decreased free fall distance of the loaded material, then when the body is to be unloaded the latch pin 25 connecting each pair of longitudinal frame members is first removed and the forward lift mechanism 5 is actuated to raise the front end of the body upwardly above the forward frame section 20. With projection of the lift mechanism, the weight at the forward end of the body is transmitted through the lift mechanism into the forward frame section at the interconnection 7 ahead of the axle on which the forward set of wheels 13 are mounted. Downward force transmitted to the forward end of the frame section 20 will tend to depress the forward end of the frame and rock it about the front axle and raise both frame sections at their adjoining interpivoted ends with the rear section 21 remaining in bearing engagement with the underside of the body until the stop abutments 26 and 27 swing into engagement and limit further upward buckling of the frame sections, as seen in FIG. 2. The rearward frame section 21 will thus have been swung about the axis of the rearmost set of wheels 12 to a predetermined angle of downward and rearward inclination and the unloading edge of the dump body will have been lowered from its original height of the normal hauling position of the parts. In the event the loaded material is of a character that all of it does not slide off of the body when tilted to the position of FIG. 2, the lift mechanism can be further projected to raise the front end of the body higher and about the rearward fulcrum mounting 3 for a greater angle of body tilt, as seen in FIG. 3.

It will be noted from FIG. 3 that when the rearward frame section 21 has been swung to the substantially inclined position of FIGS. 2 and 3, the rearward spring and axle assembly will have also tilted to a like angle of inclination and the vertical load is no longer taken entirely by the leaf springs whose longitudinal extent will now be inclined and closer to the line of load imposition. By arranging the distance rods 18 so that they extend in a direction in alignment with or closely parallel to a line 30 (see FIG. 3) projecting through the axes of the rear axle and the pivot connection 23, the downward load from the frame is transferred to the rear axle partly through the distance rods 18 and the springs are relieved from that part of the load taken by the distance rods.

Following the dumping operation, lift mechanism 5 is retracted to lower the front of the body back to the normal hauling position and with the latch 25 in position to hold the frame sections against buckling, the vehicle is again ready for transit and reloading.

Various modifications in the detail structure described above are contemplated as being within the scope of the attached claims.

What is claimed is:

1. A self-supporting unitary dump trailer comprising, in combination: a chassis including a longitudinal frame and supporting non-steerable front and rear wheel and dead axle assemblies therefor disposed adjacent the front and rear ends respectively of the frame; said frame comprising forward and rearward frame sections arranged end-to-end and in longitudinal alignment and means pivotally connecting the adjacent ends of the frame sections together whereby said sections may be articulated with respect to one another about a transverse axis; the forward frame section being substantially longer than the rearward frame section and the axis of articulation of said sections being disposed closely adjacent the axle of said rear wheel and axle assembly; releasable means for locking said frame section against articulation; a dump body of length substantially coextensive with said longitudinal frame and being positioned thereon so that its major length extends forwardly of said axis of articulation; means pivotally interconnecting the dump body and the rearward frame section in manner as permits bodily upward tilting movement of said dump body with respect to said rear frame section about a transverse axis extending across the rearward end of said rearward frame section; an extensible lift device for bodily tilting said dump body about said rear-end axis, said lift device being connected at its uper end to the front end of the dump body and at its lower end to the front end of the forward frame section; and a tow bar pivotally connected to and extending forwardly from the forward frame section; the construction and arrangement being such that when the locking means is effective to lock the frame sections as aforesaid, the dump body may be tilted to a low angle dumping position without frame articulation and that when the locking means is released, the dump body may be selectively tilted either to a first higher position as permitted by articulation of the frame sections with respect to one another or to a second yet higher position as permitted by the upward tilting movement of the dump body with respect to the rearward frame section.

2. A self-supporting dump trailer as in claim 1, wherein the front end wall of the dump body is provided with a forwardly opening pocket in which said lift device is accommodated.

3. A self-supporting dump trailer as in claim 1, and interengageable stop abutments carried by said frame sections adjacent their pivotally interconnected adjacent ends, said abutments being normally spaced from one another but being engageable responsive to a predetermined degree of frame articulation, thereby to prevent further frame articulation with continuing upward tilt of the dump body under control of said lift device.

References Cited in the file of this patent

UNITED STATES PATENTS

| | | |
|---|---|---|
| 587,960 | Hammer | Aug. 10, 1897 |
| 1,424,424 | Spencer | Aug. 1, 1922 |
| 1,707,345 | Brown | Apr. 2, 1929 |
| 2,469,199 | Lewis | May 3, 1949 |
| 2,717,707 | Martin | Sept. 13, 1955 |
| 2,718,431 | Pietroroia | Sept. 20, 1955 |
| 2,883,237 | Schonrock | Apr. 21, 1959 |
| 2,892,659 | Francois | June 30, 1959 |
| 3,027,197 | Tripodi | Mar. 27, 1962 |
| 3,039,822 | McManus | June 19, 1962 |